United States Patent
Smolin et al.

(10) Patent No.: US 11,487,015 B2
(45) Date of Patent: Nov. 1, 2022

(54) ATMOSPHERIC CHARACTERIZATION SYSTEMS AND METHODS

(71) Applicant: BLUEHALO LLC, Huntsville, AL (US)

(72) Inventors: Levi J. Smolin, Huntsville, AL (US); Alexis H. Clark, Owens Crossroads, AL (US)

(73) Assignee: BLUEHALO, LLC, Huntsville, AL (US)

( * ) Notice: Subject to any disclaimer, the term of this patent is extended or adjusted under 35 U.S.C. 154(b) by 1155 days.

(21) Appl. No.: 15/997,304

(22) Filed: Jun. 4, 2018

(65) Prior Publication Data
US 2018/0348375 A1 Dec. 6, 2018

Related U.S. Application Data

(60) Provisional application No. 62/515,299, filed on Jun. 5, 2017.

(51) Int. Cl.
*G01K 13/00* (2021.01)
*G01S 17/95* (2006.01)
(Continued)

(52) U.S. Cl.
CPC ............... *G01S 17/95* (2013.01); *G01J 9/04* (2013.01); *G01K 3/14* (2013.01); *G01K 13/00* (2013.01);
(Continued)

(58) Field of Classification Search
CPC .. G01S 17/95; G01J 9/04; G01K 3/14; G01K 15/005; G01K 15/007; G01W 2001/003;
(Continued)

(56) References Cited

U.S. PATENT DOCUMENTS 3,465,339 A * 9/1969 Marner .................. G01K 1/024
73/170.27
3,665,467 A * 5/1972 Haroules ................ G01W 1/00
455/303
(Continued)

FOREIGN PATENT DOCUMENTS

CN 108693377 A * 10/2018 ............. G01K 11/22
RU 2735909 C1 * 11/2020
(Continued)

*Primary Examiner* — Gail Kaplan Verbitsky
(74) *Attorney, Agent, or Firm* — Amster, Rothstein & Ebenstein LLP

(57) ABSTRACT

The present disclosure is of an atmospheric characterization system that has a central processing board that has a first and a second communication interface. Further, the atmospheric characterization system further has a first precision temperature sensor that is communicatively coupled to the central processing board via the first communication interface and positioned a distance from a first side of the processing board, wherein the precision temperature measures a first temperature and transfers data indicative of the first temperature to the central processing board. In addition, the atmospheric characterization system has a second precision temperature sensor that is communicatively coupled to the central processing board via the second communication interface and positioned the distance from a second opposing side of the processing board such that the first precision temperature sensor and the second precision temperature sensor are equidistance from the processing board and a distance between the first precision sensor and the second precision sensor is a predetermined distance, r, and the second precision temperature sensor measures a second temperature and transfers data indicative of the second temperature to the central processing board simultaneously with the transferring of the first temperature. Additionally, the atmospheric characterization system has a processor that (Continued)

receives the first temperature and the second temperature and calculates a value indicative of atmospheric turbulence based upon the first temperature and the second temperature, wherein the value indicative of the atmospheric turbulence is used for designing, modifying, calibrating, or correcting an optical system.

26 Claims, 16 Drawing Sheets

(51) Int. Cl.
*G01J 9/04* (2006.01)
*G01K 15/00* (2006.01)
*G01K 3/14* (2006.01)
*G01W 1/00* (2006.01)

(52) U.S. Cl.
CPC ......... *G01K 15/005* (2013.01); *G01K 15/007* (2013.01); *G01W 2001/003* (2013.01)

(58) Field of Classification Search
CPC ........... G01W 1/08; G01W 1/18; G01W 1/00; G01W 1/06; G01W 2001/006; G01W 2203/00; G01W 1/02
USPC .......................................... 356/28.5, 43, 44
See application file for complete search history.

(56) References Cited

U.S. PATENT DOCUMENTS

| | | | | |
|---|---|---|---|---|
| 5,639,964 | A * | 6/1997 | Djorup | G01P 5/12 |
| | | | | 73/861.85 |
| 2013/0314694 | A1* | 11/2013 | Tchoryk, Jr. | G01S 17/58 |
| | | | | 356/28.5 |
| 2019/0377093 | A1* | 12/2019 | Wiebold | G01S 17/95 |
| 2022/0091007 | A1* | 3/2022 | Fan | G01N 21/538 |

FOREIGN PATENT DOCUMENTS

| | | | | |
|---|---|---|---|---|
| WO | WO9204698 | A1 * | 3/1992 | |
| WO | WO-2020257859 | A1 * | 12/2020 | G01W 1/00 |

* cited by examiner

ATMOSPHERIC CHARACTERIZATION SYSTEMS AND METHODS

CROSS REFERENCE TO RELATED APPLICATION

This application claims priority to U.S. Provisional Patent Application Ser. No. 62/515,299 entitled Atmospheric Characterization Systems and Methods and filed on Jun. 5, 2017, which is incorporated herein by reference.

BACKGROUND

As engineers and scientists work to refine free-space optical systems that operate over long terrestrial ranges, it is helpful to better understand, characterize, and quantify the atmospheric properties of the environment. One such atmospheric property of interest is the refractive-index structure coefficient, or $Cn^2$, which describes small changes in the base atmospheric refractive index. Over very short distances, small index of refraction changes usually cause negligible problems to all but the most demanding optical systems, such as interferometric systems, but can have a large effect on Optical Path Length (OPL) as short as 1 km.

At the lowest level of understanding, index of refraction fluctuations in the atmosphere originate with turbulent air motion. The source of atmospheric turbulence originates from temperature gradients on the surface of the earth as solar radiation and daily weather patterns cause a heating and cooling cycle. The large-scale temperature gradient from the surface of the earth to upper atmosphere that is both easily measured and causes atmospheric turbulence also applies to very small temperature gradients that are not separated by such vast distances. These small temperature gradients are considered randomly distributed throughout a larger temperature gradient. The index of refraction of air is sensitive to fluctuations in temperature yielding a randomly distributed index of refraction for air through a slant or horizontal path of small temperature gradients, setting the groundwork for understanding the differential temperature impact on the refractive-index structure coefficient.

Systems like large terrestrial telescopes, free-space laser communication systems and High Energy Laser (HEL) free space systems require a stable index of refraction for optimum operation. It is understood that $Cn^2$ is the most disruptive close to ground level so large telescope construction projects take the ground level atmospheric properties into consideration and are consequently built in locations with higher altitude or, at a minimum, on the highest floor of university buildings away from ground atmospheric turbulence. Mobile HEL systems rarely have the luxury of selecting an ideal operating environment and therefore must either be designed to operate with poor optical atmospheric properties or the environmental impact on performance must be understood and estimable.

The measurement of the refractive-index structure coefficient, $Cn^2$, has been used for several specific purposes related to HEL testing. Recent test events have utilized $Cn^2$ measurement at various locations for comparison to historic models such as the Hufnagel-Valley 5/7 model, to help understand performance of HEL in relation to atmospheric turbulence, and to offer comparison of equipment used to collect $Cn^2$. While not specifically related to HEL testing, designers investigating adaptive optics systems that are being developed for imaging in high turbulence also understand the atmospheric turbulence parameters they are operating in.

Collection of measured $Cn^2$ data compared to historic models such as Hufnagel-Valley 5/7 model, High Energy Laser End-to-End Operational Simulation (HELEEOS), and the Tunic Model is of interest to understand which models closely predict $Cn^2$ per environment and altitude. As more precise models are developed and compared to existing models, the quantifying for accuracy will continue to measure $Cn^2$ at a test site.

HEL field tests are heavily instrumented with a vast array of high speed cameras, beam monitoring and evaluation systems, meteorological data collection systems, and atmospheric scintillation measurement devices. One such atmospheric propagation effects on a HEL system include transmission losses, turbulence, and thermal blooming. The measurements from all these devices are critical to understanding the performance of the HEL under test, with a focus on the measurement of $Cn^2$.

Standalone adaptive optics systems suffer from similar environmental performance factors as HEL systems except for thermal blooming. Adaptive optics systems under test will have a similar set of instrumentation as HEL tests to include devices that measure atmospheric turbulence. The amount of atmospheric turbulence that is induced by environments is also of interest during the adaptive optics design process. With the goal of the adaptive optics system to correct the outgoing wavefront and compensate for atmosphere induced optical aberrations, the amount of atmospheric turbulence will drive the depth of control required for the adaptive optics system. When using a deformable mirror to correct the wavefront, the amount of peak to valley travel available limits the amount of turbulence that can be corrected. Measurements of the refractive-index structure coefficient, $Cn^2$, in real environments can help engineers estimate maximum wavefront error and select adaptive optics with sufficient range of motion to control the turbulence.

Known measurement methods of atmospheric turbulence data includes

Scintillation Detection and Ranging (SCIDAR)—imaging the shadow patterns in the scintillation of starlight.

Low Layer Scidar (LOLAS)—small aperture version of SCIDAR designed for low altitude profiling Slope Detection and Ranging (SLODAR)—operated by detecting the backscatter from atmospheric conditions.

Multi-Aperture Scintillation Sensor (MASS)—optical sensor that creates two images of a single target on a focal plane array to estimate atmospheric scintillation.

Moon Scintillometer (MooSci)—uses multiple photoelectric diodes at various distances to monitor minor changes in light reflected from the Moon.

Radio Detection and Ranging (RADAR)—RAdio Detection and Ranging mapping of atmospheric turbulence.

Differential Image Motion Monitor (DIMM)—optical sensor that creates two images of a single target on a focal plane array and uses statistical area of interest tracking to estimate atmospheric scintillation.

Atmospheric Characterization System (ACS—Shack-Hartmann Wavefront Sensor)—optical system that measures changes in wavefront from a source beacon.

Scintillometer (Popular name brands are Scintec and Kipp & Zonen)—commercially available scintillation measurement device.

Balloon-Borne Thermometers—temperature sensing devices that estimate atmospheric characteristics.

Many atmospheric turbulence profiling systems sampled are optical systems that image a beacon or target from known distance and then compute an estimate of atmospheric turbulence based on the sensor data. All the listed atmospheric turbulence profiling systems, except the Balloon-Borne Thermometers, measure an integrated path of turbulence and not turbulence at a nodal location. Additionally, several of the atmospheric profiling systems are path weighted and require further analysis.

Advantages of optical atmospheric profilers for measuring $Cn^2$ when testing with HEL or adaptive optics systems are that the systems are accepted by the test community as the metric of turbulence measurements. Atmospheric characterization systems measuring the same optical path as a HEL device under test essentially use the same mechanism as an imaging sensor for an adaptive optics system but without any correction for atmospheric effects. Many optical profilers have graduated from university use and become commercial products, which implies data integrity, system stability, and system reliability. These systems can also profile vast horizontal and vertical distances without the need for using multiple characterization devices.

Disadvantages to measuring $Cn^2$ with an optical system share some of their strengths. The downside to measuring an integrated optical turbulence path is that the path is averaged and weighted. Turbulence induced by micro-meteorology over various terrain is essentially path averaged and the instruments do not have the ability to specifically determine the turbulence-generating at any a single point along the optical path. Optical atmospheric turbulence characterization devices are also designed for a minimum and maximum path which they can measure, 250 m-6000 m. (BLS900, 2017). Many optical atmospheric turbulence characterization devices also require a beacon, or light source, to image down range. The addition of a down range component implies two devices, two power sources, and some amount of alignment and setup prior to taking a $Cn^2$ measurement. Finally, the majority of $Cn^2$ measurement devices are expensive initial investments, and in some cases, cost prohibitive to own and operate.

SUMMARY

The present disclosure is of an atmospheric characterization system that has a central processing board that has a first and a second communication interface. Further, the atmospheric characterization system further has a first precision temperature sensor that is communicatively coupled to the central processing board via the first communication interface and positioned a distance from a first side of the processing board, wherein the precision temperature measures a first temperature and transfers data indicative of the first temperature to the central processing board. In addition, the atmospheric characterization system has a second precision temperature sensor that is communicatively coupled to the central processing board via the second communication interface and positioned the distance from a second opposing side of the processing board such that the first precision temperature sensor and the second precision temperature sensor are equidistance from the processing board and a distance between the first precision sensor and the second precision sensor is a predetermined distance, r, and the second precision temperature sensor measures a second temperature and transfers data indicative of the second temperature to the central processing board simultaneously with the transferring of the first temperature. Additionally, the atmospheric characterization system has a processor that receives the first temperature and the second temperature and calculates a value indicative of atmospheric turbulence based upon the first temperature and the second temperature, wherein the value indicative of the atmospheric turbulence is used for designing, modifying, calibrating, or correcting an optical system.

Further, the present disclosure describes an atmospheric characterization method that comprises the steps of: (1) measuring a first temperature via a precision temperature sensor communicatively coupled to a central processing board and positioned a distance from a first side of the processing board; (2) measuring a second temperature via a second precision temperature sensor communicatively coupled to the central processing board and positioned the distance from a second opposing side of the processing board such that the first precision temperature sensor and the second precision temperature sensor are equidistance from the central processing board, and the distance between the first precision sensor and the second precision temperature sensor is a predetermined distance, r; (3) transferring data indicative of the first temperature and the second temperature sensor to the central processing board simultaneously; (4) receiving, by a processor, the first temperature and the second temperature; (5) calculating a value indicative of atmospheric turbulence based upon the first temperature, the second temperature, and the distance, r, and (6) designing, modifying, calibrating, or correcting an optical system based upon the value indicative of the atmospheric turbulence.

DETAILED DESCRIPTION

Figure 1:
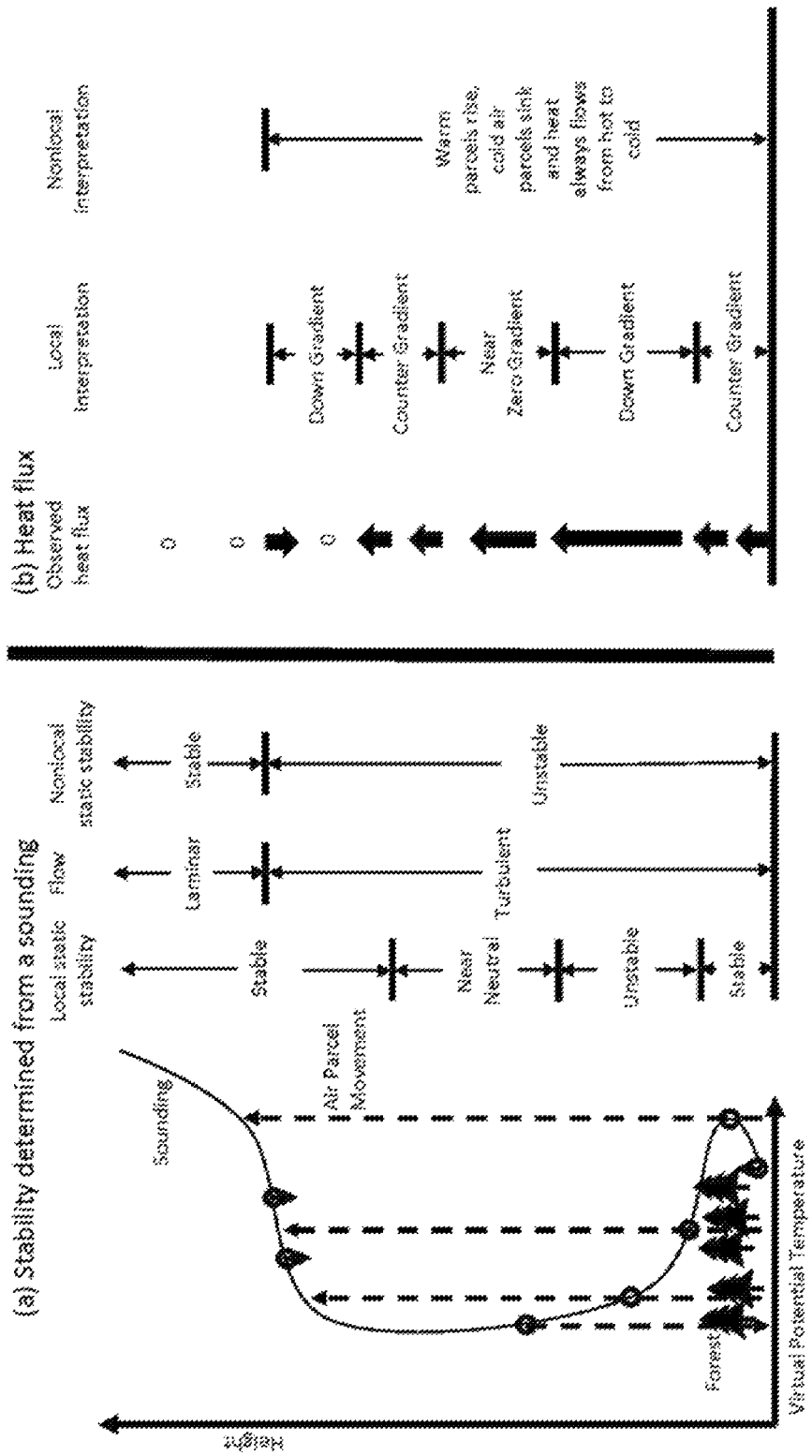
FIG. 1 is a diagram that depicts the exchange of heat flux leading to turbulence, which illustrates how heat flux transitions through the lower atmosphere.

The present disclosure is an atmospheric characterization system that measures atmospheric turbulence over a period of time, which can them be used to design, modify, or calibrate optical systems to result in more accuracy of the optical system. The atmospheric characterization system comprises a central processing board. Additionally, the atmospheric characterization system comprises a first temperature sensor communicatively coupled to one side of the processing board a distance $d_1$ from the processing board. Further, the atmospheric characterization system comprises a second temperature sensor communicatively coupled to an opposing side of the processing board the same distance $d_1$ from the processing board. In operation, the differential temperature of the first and second sensor is used to calculate atmospheric turbulence at a particular time and location. This data may then be used to design, modify, or calibrate an optical system so that the optical system is more accurate.

Thus, the measurement approach used for present disclosure is a differential temperature sensor (DTS) system with high resolution, low cost, digital temperature sensors that can measure the refractive-index structure coefficient, $Cn^2$, of turbulent air. In one embodiment, a custom integrated set of digital temperature sensors are used for the data collection with a key aspect of sensor selection that there must be a very small temperature resolution.

The technological improvement of using the constructed DTS system are that the sensors measure a 'nodal' location and not the typical integrated path of an optical atmospheric characterization device. The atmospheric turbulence is only measured where the sensor is located. The 'nodal' nature of the DTS sensors implies that there is not a minimum measurement path, system path averaging, or additional hardware to set up and align. Multiple DTS systems can be combined to measure an atmospheric turbulence 'area' that is not possible to measure with optical devices. The concept of the final DTS system is a low cost, low power consumption, extremely portable and accurate device.

To better understand the present disclosure, this disclosure begins with a description of the Refractive-Index Structure Coefficient, Cn2, and presents how it is employed to describe the turbulence in the atmosphere. This includes its dependence on, most importantly, local and small temperature gradients. This is followed by the system level definition of the component requirements for the atmospheric characterization system of the present disclosure.

For the purposes of the present disclosure, it is assumed that most of atmospheric turbulence is driven by temperature changes in the environment with a local background mean pressure and temperature. Other experiments have considered the effects of humidity fluctuations, wind speed, wind direction, and solar loading as additional sources of atmospheric turbulence. The source of these changes comes from the intensity of the vertical convection transfer of heat, moisture, and momentum during the day that is determined from the surface heat flux and thermal structure of the entire mixed turbulent layer.

The exchange of heat flux which leads to turbulence can be seen in FIG. 1, which shows how heat flux transitions through the lower atmosphere. On the left (a) of FIG. 1 is a vertical profile of the mean potential temperature within and above a forest canopy during the daylight hours. There is a stable layer within the forest canopy that extends to an unstable layer and then transitions to a near-neutral layer. Air above the near-neutral layer becomes stable and has minimal turbulence. The vertical dashed lines show the deep movement of air parcels within the boundary layer.

The right side (b) of FIG. 1 describes the heat flux that is observed under conditions of panel (a). Heavy vertical arrows indicate the directions and magnitude of vertical fluxes of heat. From FIG. 1 panel (b) larger magnitudes of heat flux correlate to turbulent and unstable air. Assuming a local-closure approximation for the vertical heat flux a direction and magnitude of the flux is defined by the vertical gradient of the potential temperature. This can be described mathematically where θ is potential temperature, w is the vertical component of wind, $K_H$ is the thermal diffusivity of a substrate, and z is the vertical space coordinate (altitude), which is described in the following equation:

$$\overline{\theta w} = -K_H \frac{\partial}{\partial z} \overline{\theta} \qquad \text{Equation 1}$$

Because the physical source of the index of refraction variations is derived from the temperature gradient in turbulent air motion, the index of refraction can be modeled as the sum of the mean index of refraction, $n_0$, and the randomly fluctuating term, $n_1(\vec{r},t)$:

$$n(\vec{r},t) = n_0 + n_1(\vec{r},t) \qquad \text{Equation 2}$$

where $\vec{r}$ is a three-dimensional position vector, and t is time. These small fluctuating index of refraction terms are inconsequential for short distances but can alter a beam wavefront, Optical Path Length (OPD), or position at longer distances.

Figure 2:
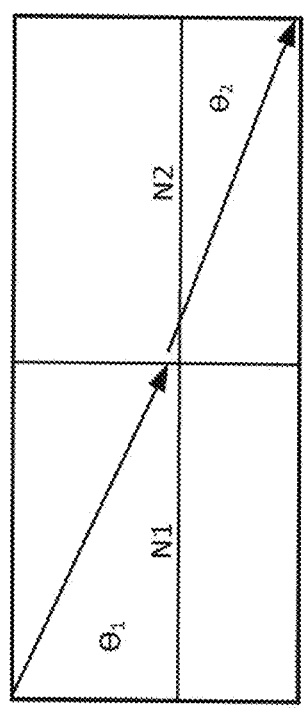
FIG. 2 is a diagram illustrating Snell's Law and the material change interface.

To understand the impact of $n_1(\vec{r},t)$ on an optical system, a simple geometrical optics model is used that utilize Snell's Law, $$n_1 \sin(\theta_1) = n_2 \sin(\theta_2) \qquad \text{Equation 3}$$

where $n_1$ is the first material index of refraction, $\theta_1$ is the angle the ray strikes the interface of the two materials, $n_2$ is the second material index of refraction, and $\theta_2$ is the angle the ray leaves the interface of the second material. This is illustrated in FIG. 2.

Figure 3:
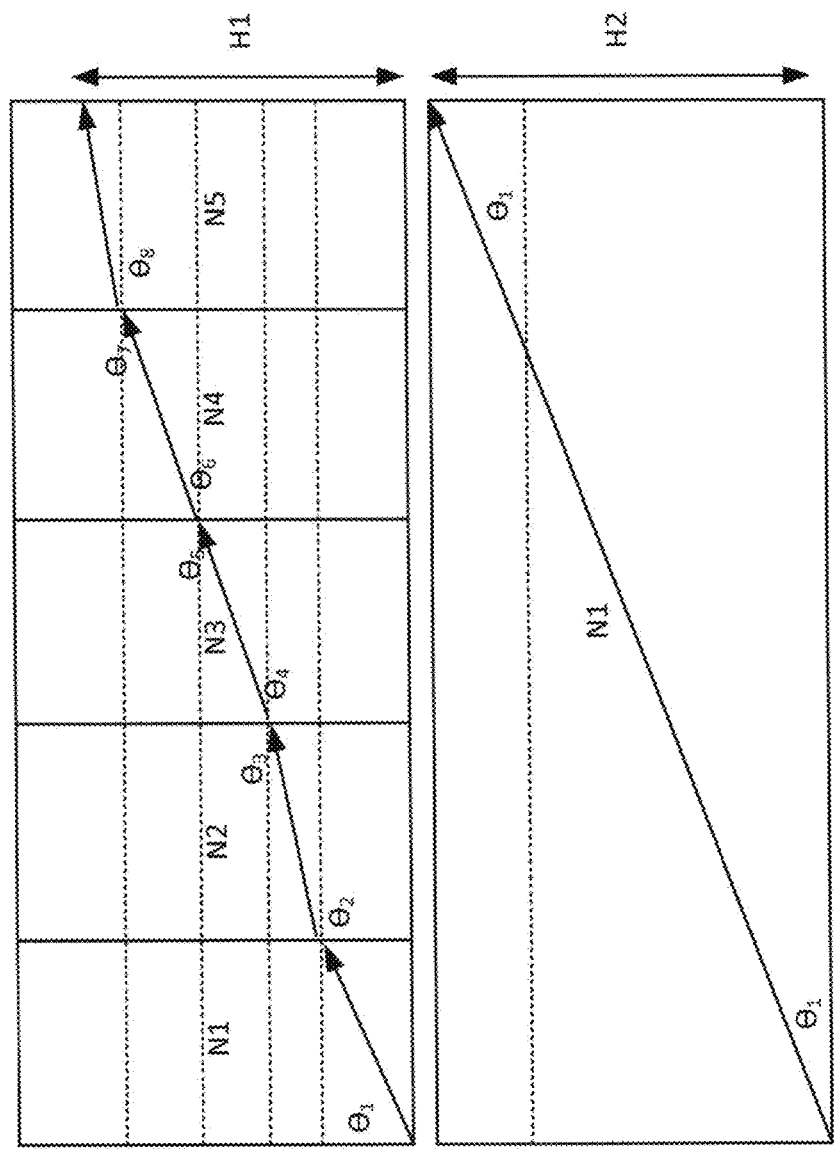
FIG. 3 is a diagram illustrating how a ray bends as it transitions from material to material over a distance.
Figure 4:
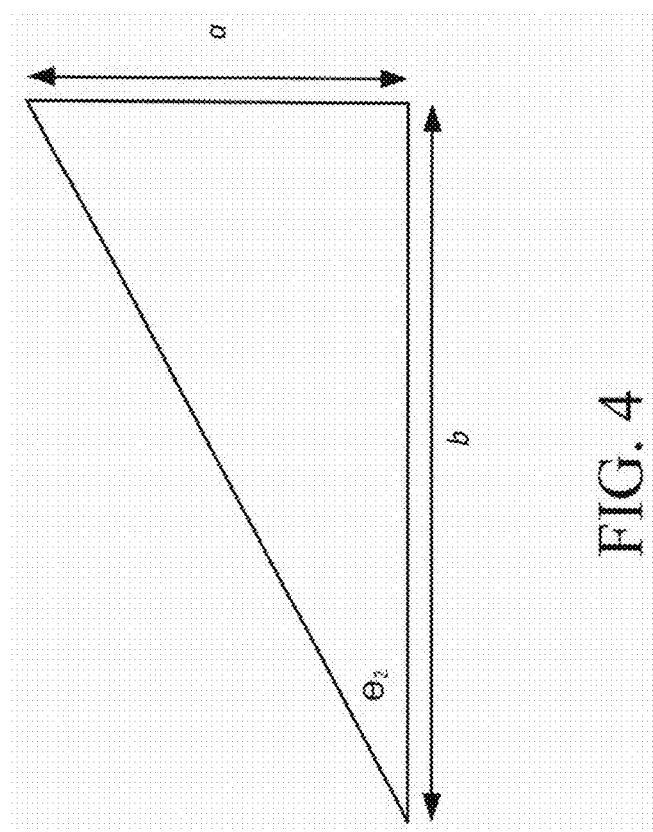
FIG. 4 is a diagram illustrating the right-angle relationship as described with reference to Snell's Law.

Expanding Snell's Law from two materials to 5-10 over distances of 100 meters starts to create notable differences in ray height from where the ray would land without a change in index of refraction. FIG. 3 illustrates the basic concept of how a ray will bend as it transitions from material to material over a distance. FIG. 3 depicts ray tracing through isotropic volumes of different refractive index compared to homogeneous volumes of similar refractive index.

Note that calculations to understand the real impact changes in index of refraction cause over a 100-meter path at various angles using rearranged terms in Snell's law and basic geometry may be performed. If the change of index of refraction were constant, then the traced rays would still arrive at their target. If the change of index of refraction is varying in time, then the arrival angle and arrival height changes from moment to moment. This causes blur and distortion of the image or beam shape.

For analysis a modified Snell's Law, Equation 4 calculates the angle when moving from one volume index of refraction to the next. The thickness of the refractive index volumes was then used to calculate the height of where the ray would strike the next volume of refractive index. Equation 5, which is derived from finding the height of a right-angle triangle, is used to solve the height value.

$$\sin^{-1}\left(\frac{n_1 \sin(\theta_1)}{n_2}\right) = \theta_2 \qquad \text{Equation 4}$$

$$b(\tan\theta_2) = a \qquad \text{Equation 5}$$

Figure 5:
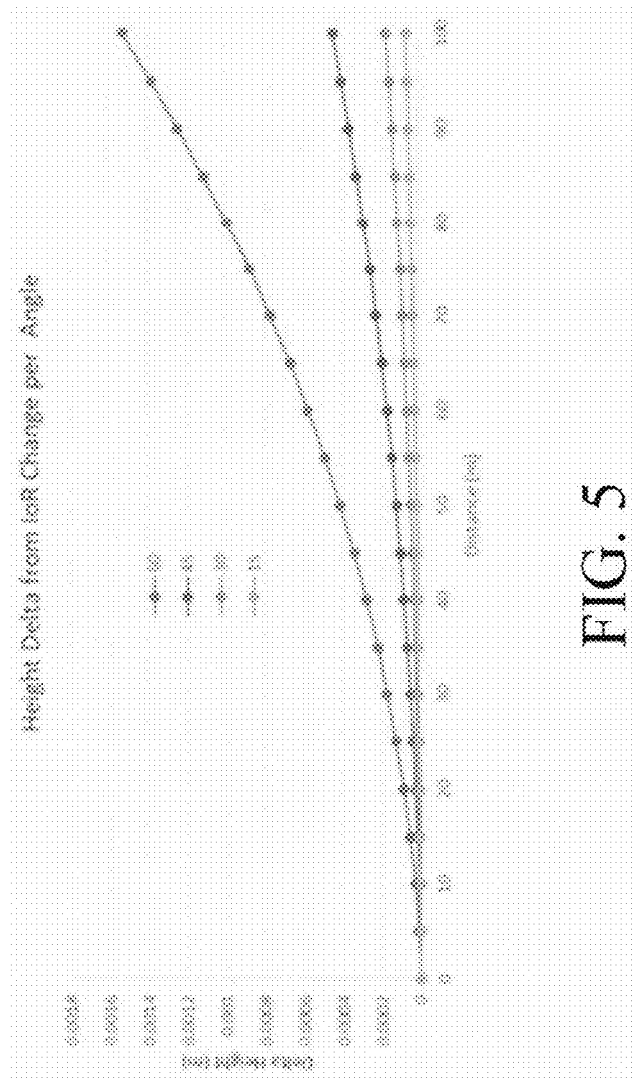
FIG. 5 is a graph depicting the change in height per distance per angle of the index of refraction.

Basic calculations are shown in Tables 1A and 1B and then illustrated in FIG. 5. The tables were calculated by following a ray that is starting at distance 0 and then evaluated every 5 meters, b, up to 100 meters. The starting incident angle, $\theta_1$, was set to 60 degrees. The change in height, a, per 5 meters, b, was calculated by using Equation 4 to yield $\theta_2$ and then by using the right-hand triangle relationship from Equation 5. A standard index of refraction was assumed, 1.00029, and a refractive index structure coefficient term, $Cn^2$, was added for each 5-meter-thick volume of atmosphere.

To calculate the change in height caused by flowing through many volumes of atmosphere with different indexes of refraction a homogeneous volume of atmosphere was also calculated, the Control Height. The Control Height assumes that there is no change in index of refraction across the 100-meter path and uses the same starting angle of 60 degrees. The difference between the homogeneous volume of atmosphere and the volumes of air with varying indexes of refraction (IoR) was then calculated as the Height Delta.

Tables 1A and 1B outline these calculations for the 60-degree propagation case. The difference in height over 100 meters was calculated at 0.001525 meters or 0.1525 cm.

TABLE 1A

Height Delta from IoR Change

| Distance (m) | Incident Angle (Degrees) | Incident Angle (Radians) | Height | Air (IoR) |
|---|---|---|---|---|
| 0 | 60 | 1.047197551 | 0 | 1.00029 |
| 5 | 59.99996158 | 1.047196881 | 8.660241 | 1.00029 |
| 10 | 59.99995773 | 1.047196814 | 17.32048 | 1.00029 |
| 15 | 59.99991931 | 1.047196143 | 25.98071 | 1.00029 |
| 20 | 59.99991547 | 1.047196076 | 34.64093 | 1.00029 |
| 25 | 59.99987704 | 1.047195405 | 43.30114 | 1.00029 |
| 30 | 59.9998732 | 1.047195338 | 51.96135 | 1.00029 |
| 35 | 59.99986936 | 1.047195271 | 60.62156 | 1.00029 |
| 40 | 59.99983093 | 1.0471946 | 69.28175 | 1.00029 |
| 45 | 59.99982709 | 1.047194533 | 77.94195 | 1.00029 |
| 50 | 59.99978867 | 1.047193863 | 86.60213 | 1.00029 |
| 55 | 59.99978483 | 1.047193796 | 95.26231 | 1.00029 |
| 60 | 59.9997464 | 1.047193125 | 103.9225 | 1.00029 |
| 65 | 59.99974256 | 1.047193058 | 112.5826 | 1.00029 |
| 70 | 59.99970414 | 1.047192387 | 121.2428 | 1.00029 |
| 75 | 59.99970029 | 1.04719232 | 129.9029 | 1.00029 |
| 80 | 59.99966187 | 1.04719165 | 138.5631 | 1.00029 |
| 85 | 59.99965803 | 1.047191583 | 147.2232 | 1.00029 |
| 90 | 59.99961961 | 1.047190912 | 155.8833 | 1.00029 |
| 95 | 59.99961576 | 1.047190845 | 164.5434 | 1.00029 |
| 100 | 59.99957734 | 1.047190174 | 173.2036 | 1.00029 |

TABLE 1B

Height Delta from IoR Change

| Distance (m) | Cn2 | IoR Change | Resulting IoR | Control Height | Height Delta |
|---|---|---|---|---|---|
| 0 | 1.50E−13 | 3.87298E−07 | 1.000290387 | 0 | 0 |
| 5 | 1.50E−15 | 3.87298E−08 | 1.000290039 | 8.660254038 | 1.34E−05 |
| 10 | 1.50E−13 | 3.87298E−07 | 1.000290387 | 17.32050808 | 2.82E−05 |
| 15 | 1.50E−15 | 3.87298E−08 | 1.000290039 | 25.98076211 | 5.63E−05 |
| 20 | 1.50E−13 | 3.87298E−07 | 1.000290387 | 34.64101615 | 8.58E−05 |
| 25 | 1.50E−15 | 3.87298E−08 | 1.000290039 | 43.30127019 | 0.000129 |
| 30 | 1.50E−15 | 3.87298E−08 | 1.000290039 | 51.96152423 | 0.000173 |
| 35 | 1.50E−13 | 3.87298E−07 | 1.000290387 | 60.62177826 | 0.000219 |
| 40 | 1.50E−15 | 3.87298E−08 | 1.000290039 | 69.2820323 | 0.000273 |
| 45 | 1.50E−13 | 3.87298E−07 | 1.000290387 | 77.94228634 | 0.000338 |
| 50 | 1.50E−15 | 3.87298E−08 | 1.000290039 | 86.60254038 | 0.000412 |
| 55 | 1.50E−13 | 3.87298E−07 | 1.000290387 | 95.26279442 | 0.000487 |
| 60 | 1.50E−15 | 3.87298E−08 | 1.000290039 | 103.9230485 | 0.000575 |
| 65 | 1.50E−13 | 3.87298E−07 | 1.000290387 | 112.5833025 | 0.000665 |
| 70 | 1.50E−15 | 3.87298E−08 | 1.000290039 | 121.2435565 | 0.000769 |
| 75 | 1.50E−13 | 3.87298E−07 | 1.000290387 | 129.9038106 | 0.000873 |
| 80 | 1.50E−15 | 3.87298E−08 | 1.000290039 | 138.5640646 | 0.000991 |
| 85 | 1.50E−13 | 3.87298E−07 | 1.000290387 | 147.2243186 | 0.001111 |
| 90 | 1.50E−15 | 3.87298E−08 | 1.000290039 | 155.8845727 | 0.001243 |
| 95 | 1.50E−13 | 3.87298E−07 | 1.000290387 | 164.5448267 | 0.001377 |
| 100 | 1.50E−15 | 3.87298E−08 | 1.000290039 | 173.2050808 | 0.001525 |

Another way to visualize the effect of $Cn^2$ on an optical system is to calculate the Optical Path Difference (OPD) for a base refractive index compared to the base refractive index impacted by $Cn^2$. OPD is calculated from knowing a base Optical Path Length (OPL=$n_1$l) and then a modified OPL that uses different refractive indices. OPD is shown in Equation 6.

$$OPD=|n_1 l - n_2 l| \quad \text{Equation 6}$$

A modified OPD equation can be generated by replacing $n_2$ in Equation 6 with a base index of refraction combined with the square root of the refractive index structure coefficient, $Cn^2$.

$$OPD=|n_1 l - (n_1 + \sqrt{Cn^2})l| \quad \text{Equation 7}$$

where $n_1$ is the base refractive index, l is the propagation path length, and $Cn^2$ is the refractive index structure coefficient. Units of OPD will be in the same units used for the base length under evaluation.

The implication with an OPD calculation is not that the light will bend but that the wavefront will become distorted and aberrated as it propagates through turbulent air. The resulting wavefront will create an image that is blurred. The effect of OPD on the phase of the light can be calculated by dividing the OPD by a desired wavelength as seen in Equation 8.

$$\text{Phase Shift} = OPD/\lambda \quad \text{Equation 8}$$

Figure 6:
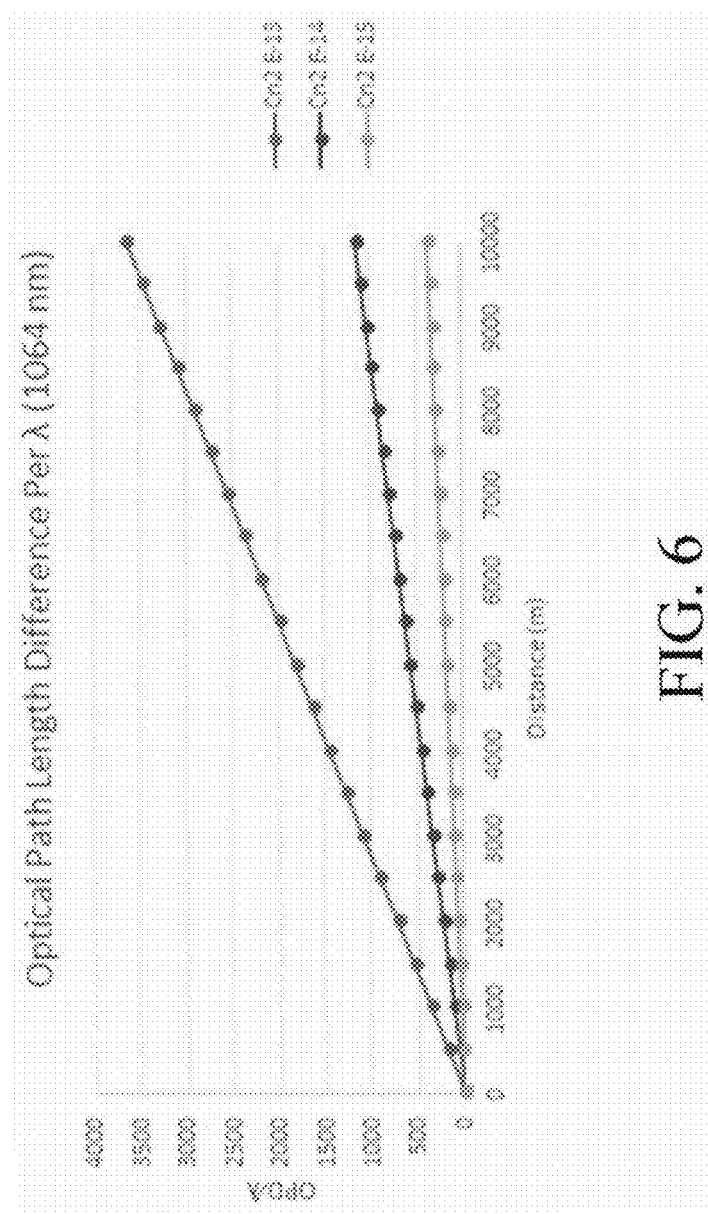
FIG. 6 is a graph depicting the maximum phase shift per distance when compared to a base index refraction and an index of refraction value as the maximum atmospheric turbulence within it.

Equation 8 may be used to make calculations for a wavelength of interest, 1064 nm, at various distances and $Cn^2$ values. FIG. 6 illustrates the maximum phase shift per distance when compared to a base index of refraction (1.00029) and an index of refraction value that as the maximum $Cn^2$ disturbance within it ($1.00029 + \sqrt{Cn^2}$). It is noted that for calculations in FIG. 6 and Table 2 a constant $Cn^2$ was used for the calculations.

Table 2 shows the calculations displayed in FIG. 6 resulting from an index of refraction change because of distance. In the worst case of atmospheric turbulence that was used for analysis, $1.5 e^{-13}$ $m^{-2/3}$, at the farthest point, 10,000 m, it is possible to see a phase shift of over 3,500 waves.

At optical wavelengths, the refractive index of air has a dependence on temperature and pressure of the environment given by $$n_1 = n - 1 = \frac{77.6P}{T} \times 10^{-6} \quad \text{Equation 9}$$

where T is the temperature of the air in degrees Kelvin and P is the pressure of the air in millibars. Temperature will be the dominating factor for calculating the index of refraction for air and can be seen when taking the derivative of $n_1$.

$$\frac{dn_1}{dT} = \frac{-77.6P}{T^2} \times 10^{-6} \quad \text{Equation 10}$$

By multiplying both sides of the equation by dT and then changing dT to $\Delta T$ and $dn_1$ to $\Delta n_1$ the equation changes to:

$$\Delta n_1 = \frac{-77.6P}{T^2} \times 10^{-6} \Delta T \quad \text{Equation 11}$$

Recall that the original $n_1(\vec{r},t)$ is considered a randomly fluctuating term like a signal fluctuating above and below zero. By squaring $n_1(\vec{r},t)$, and therefore $\Delta n_1$, the signal can be made to a power and evaluated as:

$$\Delta n_1^2 = \left[\frac{-77.6P}{T^2} \times 10^{-6}\right]^2 \Delta T^2 \quad \text{Equation 12}$$

Which is very similar to published equations that describe $Cn^2$ in terms of a temperature structure coefficient $Ct^2$, $$C_n^2 = [79^{P/T^2}]^2 \times 10^{-12} C_T^2 \quad \text{Equation 13}$$

where P is pressure in millibars and T is temperature in degrees Kelvin. The $C_T^2$ value can be measured experimen-

TABLE 2

OPD/λ Calculations for Cn2 E-13
OPD/λ Calculations for Cn2 E-13

| Distance (m) | Air (IoR) | Cn2 E-13 | IoR Change | Resulting IoR | OPL | OPL Cn2 | OPD | OPD/λ |
|---|---|---|---|---|---|---|---|---|
| 0 | 1.00029 | 1.50E-13 | 3.87298E-07 | 1.000290387 | 0 | 0 | 0 | 0 |
| 500 | 1.00029 | 1.50E-13 | 3.87298E-07 | 1.000290387 | 500.145 | 500.1452 | 0.000194 | 182.0011 |
| 1000 | 1.00029 | 1.50E-13 | 3.87298E-07 | 1.000290387 | 1000.29 | 1000.29 | 0.000387 | 364.0022 |
| 1500 | 1.00029 | 1.50E-13 | 3.87298E-07 | 1.000290387 | 1500.435 | 1500.436 | 0.000581 | 546.0033 |
| 2000 | 1.00029 | 1.50E-13 | 3.87298E-07 | 1.000290387 | 2000.58 | 2000.581 | 0.000775 | 728.0044 |
| 2500 | 1.00029 | 1.50E-13 | 3.87298E-07 | 1.000290387 | 2500.725 | 2500.726 | 0.000968 | 910.0055 |
| 3000 | 1.00029 | 1.50E-13 | 3.87298E-07 | 1.000290387 | 3000.87 | 3000.871 | 0.001162 | 1092.007 |
| 3500 | 1.00029 | 1.50E-13 | 3.87298E-07 | 1.000290387 | 3501.015 | 3501.016 | 0.001356 | 1274.008 |
| 4000 | 1.00029 | 1.50E-13 | 3.87298E-07 | 1.000290387 | 4001.16 | 4001.162 | 0.001549 | 1456.009 |
| 4500 | 1.00029 | 1.50E-13 | 3.87298E-07 | 1.000290387 | 4501.305 | 4501.307 | 0.001743 | 1638.01 |
| 5000 | 1.00029 | 1.50E-13 | 3.87298E-07 | 1.000290387 | 5001.45 | 5001.452 | 0.001936 | 1820.011 |
| 5500 | 1.00029 | 1.50E-13 | 3.87298E-07 | 1.000290387 | 5501.595 | 5501.597 | 0.00213 | 2002.012 |
| 6000 | 1.00029 | 1.50E-13 | 3.87298E-07 | 1.000290387 | 6001.74 | 6001.742 | 0.002324 | 2184.013 |
| 6500 | 1.00029 | 1.50E-13 | 3.87298E-07 | 1.000290387 | 6501.885 | 6501.888 | 0.002517 | 2366.014 |
| 7000 | 1.00029 | 1.50E-13 | 3.87298E-07 | 1.000290387 | 7002.03 | 7002.033 | 0.002711 | 2548.015 |
| 7500 | 1.00029 | 1.50E-13 | 3.87298E-07 | 1.000290387 | 7502.175 | 7502.178 | 0.002905 | 2730.016 |
| 8000 | 1.00029 | 1.50E-13 | 3.87298E-07 | 1.000290387 | 8002.32 | 8002.323 | 0.003098 | 2912.018 |
| 8500 | 1.00029 | 1.50E-13 | 3.87298E-07 | 1.000290387 | 8502.465 | 8502.468 | 0.003292 | 3094.019 |
| 9000 | 1.00029 | 1.50E-13 | 3.87298E-07 | 1.000290387 | 9002.61 | 9002.613 | 0.003486 | 3276.02 |
| 9500 | 1.00029 | 1.50E-13 | 3.87298E-07 | 1.000290387 | 9502.755 | 9502.759 | 0.003679 | 3458.021 |
| 10000 | 1.00029 | 1.50E-13 | 3.87298E-07 | 1.000290387 | 10002.9 | 10002.9 | 0.003873 | 3640.022 | tally using differential temperature sensors and then calculated using the Kolmogorov spectrum of turbulence by $$C_T^2 = \frac{\langle \Delta T^2 \rangle}{r^{2/3}},\quad\text{Equation 14}$$

where ΔT is the temperature difference obtained from a pair of temperature sensors separated by distance r. The angle brackets indicate an ensemble average.

Assuming a differential temperature sensor separation where r=1 m, then $\Delta T^2$ and $C_T^2$ are mathematically identical.

In one embodiment, the desire may be to select instrumentation that is both low cost, high resolution, and easy to implement. High accuracy temperature sensors, such as thermocouples and anemometers, that have been used in previous experiments require high end data collection equipment that is not low cost or size. Lower cost Resistive Temperature Detectors (RTD) and thermistors typically do not have the accuracy or resolution required for differential temperature measurements. To better understand requirements for a differential temperature sensor, a set of commercial off the shelf (COTS) sensors were evaluated. Minimum resolution from selected sensors were inserted as ΔT into Equation 13 and Equation 14 to generate minimum measurable $Cn^2$.

Table 3 displays the minimum measurable $Cn^2$ variations, based upon the resolution of the COTS temperature sensors. As seen in the table, the minimum resolvable $Cn^2$ is a function of minimum sensor resolution.

TABLE 4

Values Used for dT Calculations

| Instrument | Measurement | Units |
| --- | --- | --- |
| Temperature | 295.37 | Kelvin |
| Pressure | 1023.7 | Milibar |
| Sensor Spacing | 0.2 | Meter |

Equation 16 was then used to calculate ΔT of the original $Cn^2$ signal.

$$C_T^2(r^{2/3}) = \langle \Delta T^2 \rangle \quad\text{Equation 16}$$

Once ΔT increments are populated in Table 3, it is easy to make a sensor selection based upon the minimum $Cn^2$ resolution. For comparison, COTS Sensors TMP102 SEN-11931 and HRES were selected for reconstruction of the original $Cn^2$ signal. The signal was reconstructed by taking the calculated ΔT from Equation 16 and reducing each ΔT at every time increment into COTS Sensors resolution steps based upon the sensor minimum resolution using Equation 17.

$$\frac{\Delta T}{SensorResolution} = ResolutionSteps \quad\text{Equation 17}$$

Figure 9:
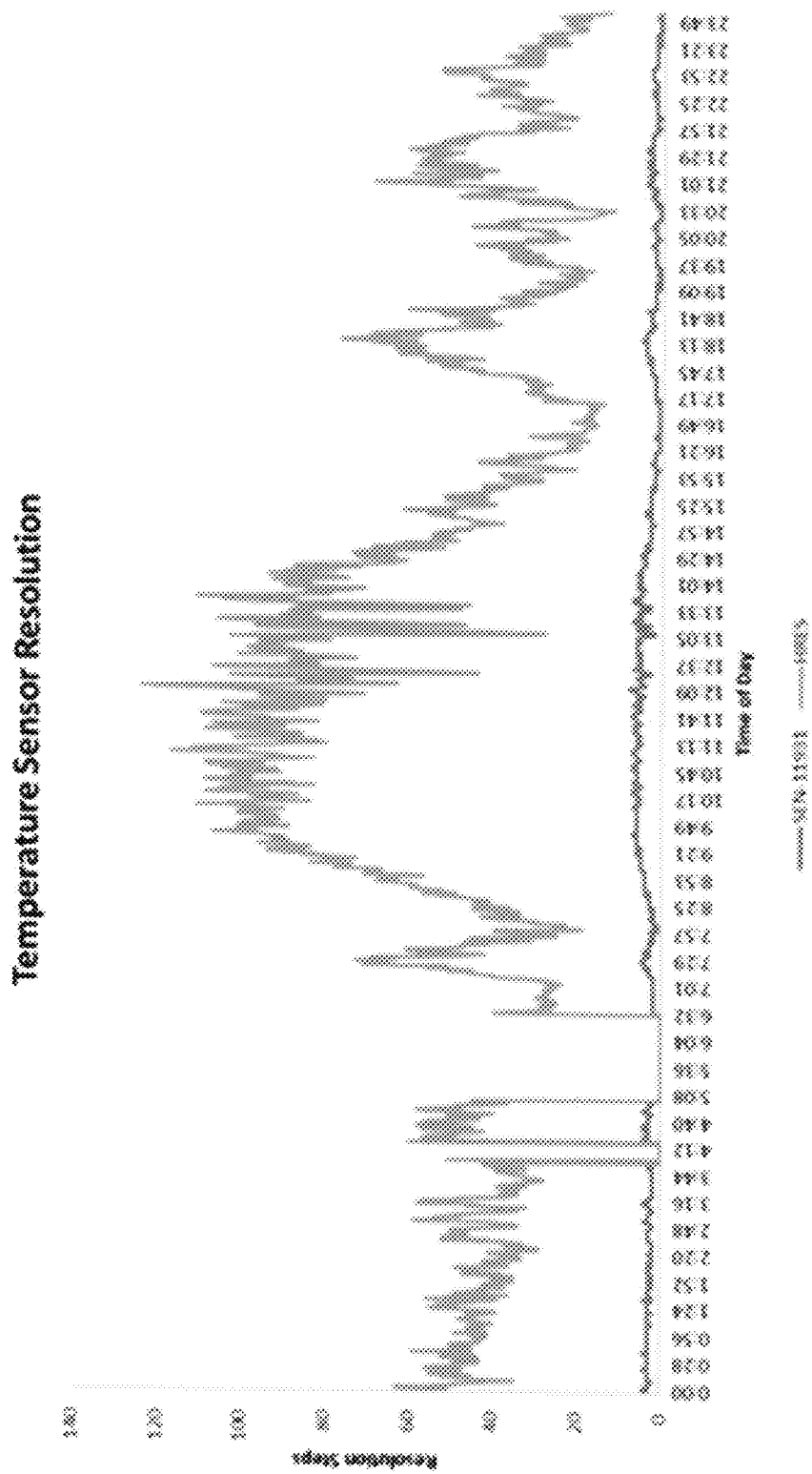
FIG. 9 is a graph depicting temperature sensor resolution in relation to the time of day.

The resulting Resolution Steps were rounded to the nearest integer number and are shown in FIG. 9. Without further analysis it is easy to see that a higher resolution temperature

TABLE 3

COTS Temperature Sensor Trade Study

COTS Sensors

| | TSci 506F (10 bit) | TSci 506F (12 bit) 1083 | TMP102 SEN-11931 | MPL3115A2 SEN-11084 | HRES |
| --- | --- | --- | --- | --- | --- |
| dT | 0.068359375 | 0.017089844 | 0.0625 | 0.029296875 | 0.00390625 |
| Ct | 0.013663947 | 0.000853997 | 0.011421944 | 0.002509705 | 4.4617E-05 |
| Cn | 5.91005E-15 | 3.69378E-16 | 4.94032E-15 | 1.08552E-15 | 1.92981E-17 |

Figure 7:
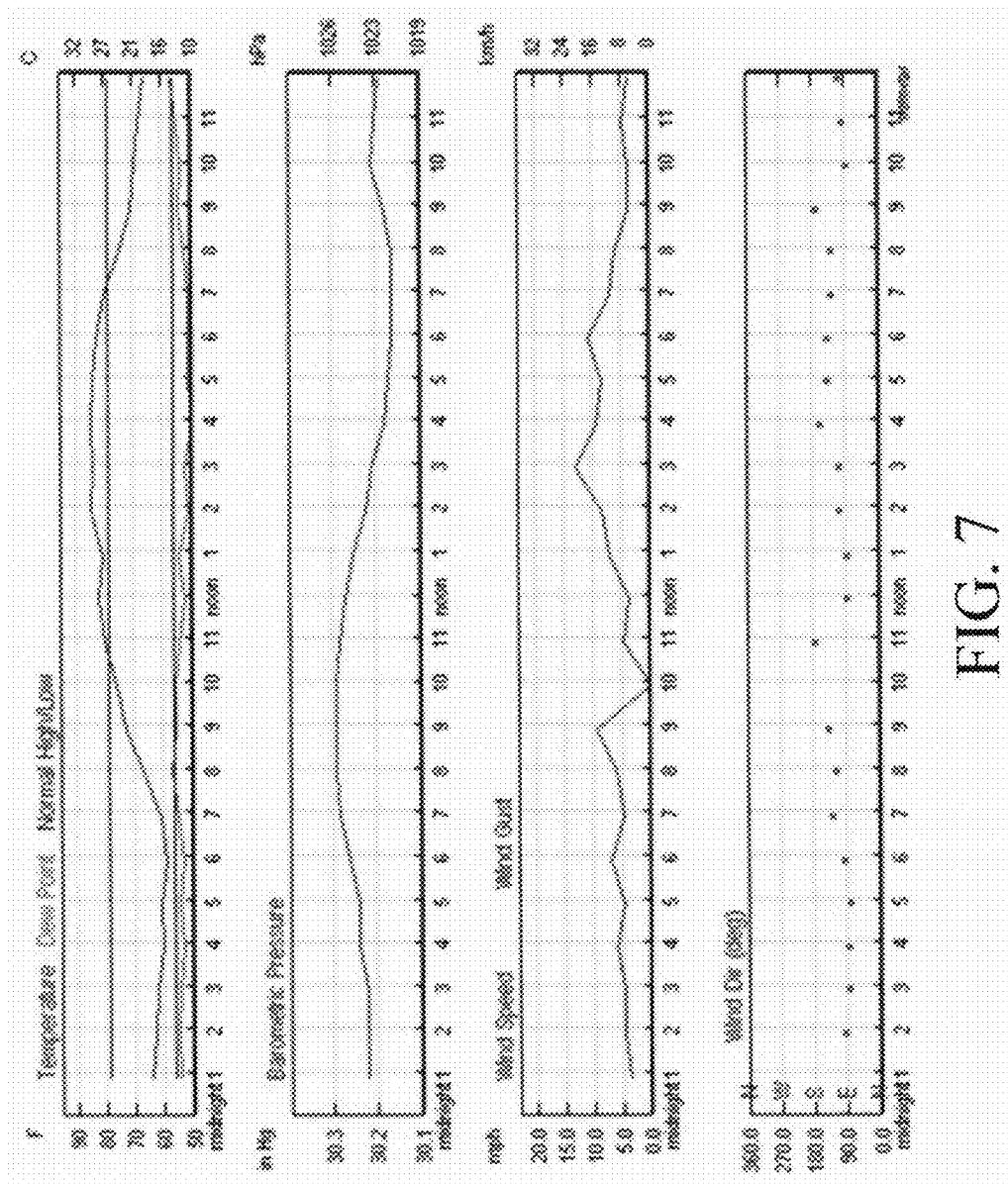
FIG. 7 is four graphs representing values used for change of temperature calculations extracted from a daily whether report.
Figure 8:
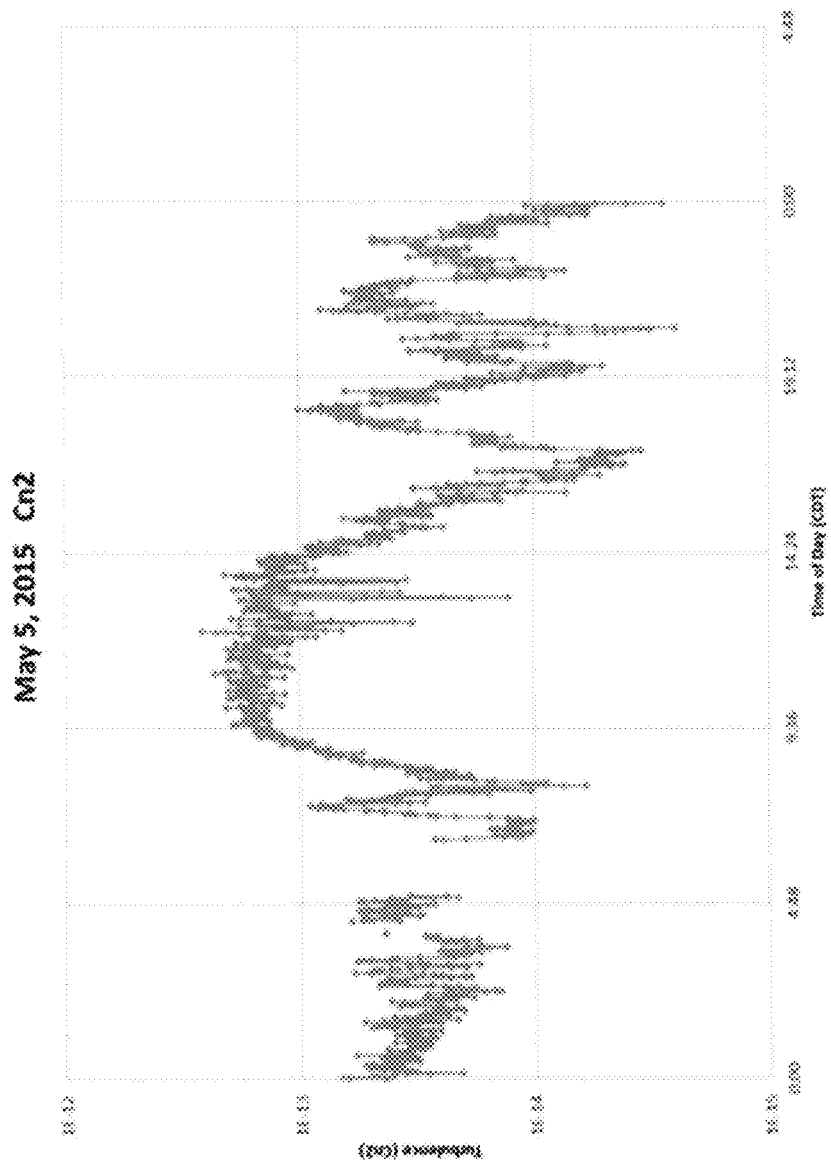
FIG. 8 is a graph representing the change in atmospheric turbulence in relation to the time of day.

To illustrate how critical sensor selection is, in one embodiment, two sensors were evaluated against $Cn^2$ data collected on a typical day. The goal of the evaluation was to deconstruct a $Cn^2$ signal into ΔT increments and then reconstruct the $Cn^2$ data using COTS Sensor resolution. FIG. 8 illustrates $Cn^2$ data collected using an Atmospheric Characterization System (ACS), or wavefront sensor, on May 5, 2015. The data from FIG. 8 was converted into $C_T^2$ using Equation 15 with values of pressure and temperature from Table 4. Data for Table 4 was extracted from the daily weather provided by the Weather Underground (Weather Underground, 2016) website and is shown in FIG. 7.

$$\frac{C_n^2}{\left[\frac{79P}{T^2}\right]^2 \times 10^{-12}} = C_T^2 \quad\text{Equation 15}$$

sensor has many more resolution steps to more closely approximate the original $Cn^2$ signal.

Rounded temperature sensor Resolution Steps are then multiplied by their associated lowest sensor resolution to fully reconstruct the 'digital' $Cn^2$ plot using Equation 18.

$$ResolutionSteps * SensorResolution = Cn^2 \quad\text{Equation 18}$$

Figure 10:
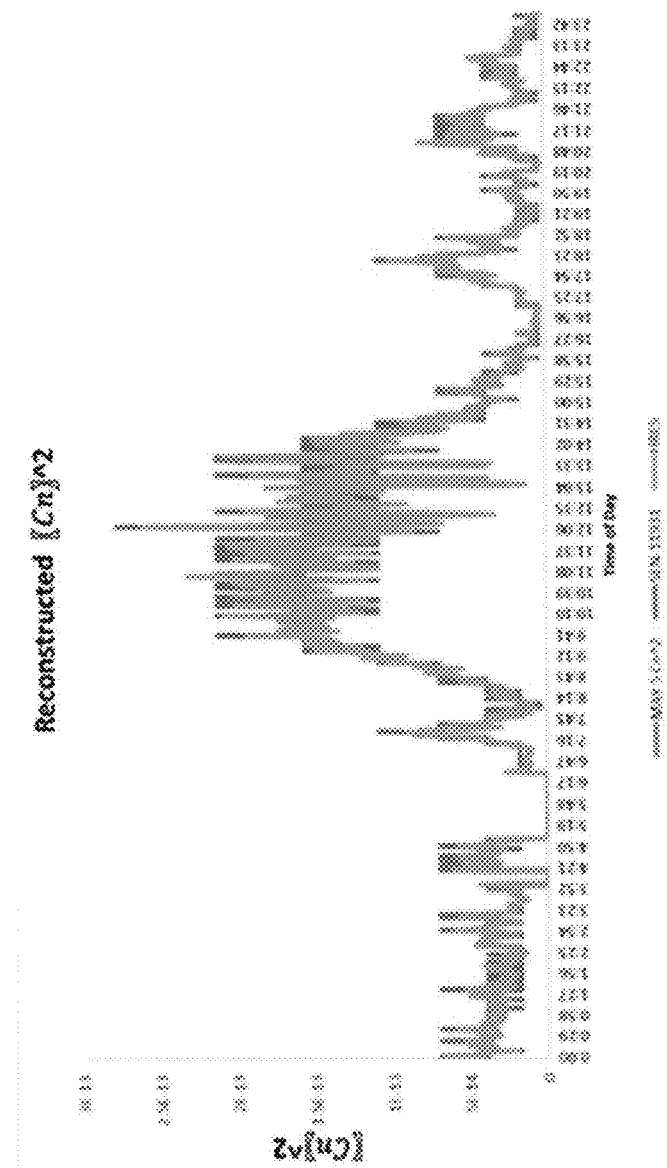
FIG. 10 is a graph depicting a higher resolution sensor used to obtain the atmospheric resolution in relation to the time of day.
Figure 11:
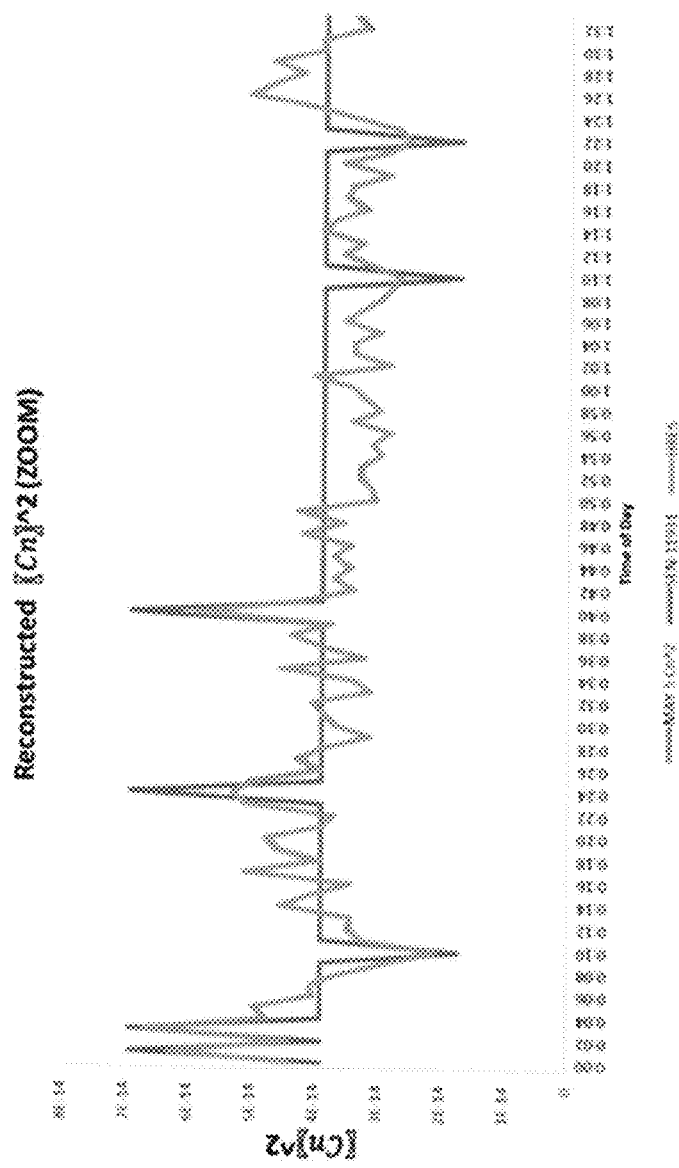
FIG. 11 is a graph such as depicted in FIG. 10 enlarged to better show the differences in the higher resolution sensor.

FIG. 10 shows the impact sensor resolution has in correctly approximating $Cn^2$. The low-resolution sensor TMP102 SEN-11931 follows the general $Cn^2$ trend but the resolution steps are clearly seen when compared with the original May 5 data. The higher resolution HRES sensor does a better job of following original May 5 $Cn^2$ data with differences apparent only upon close inspection of FIG. 10 and the enlarged FIG. 11.

Figure 12:
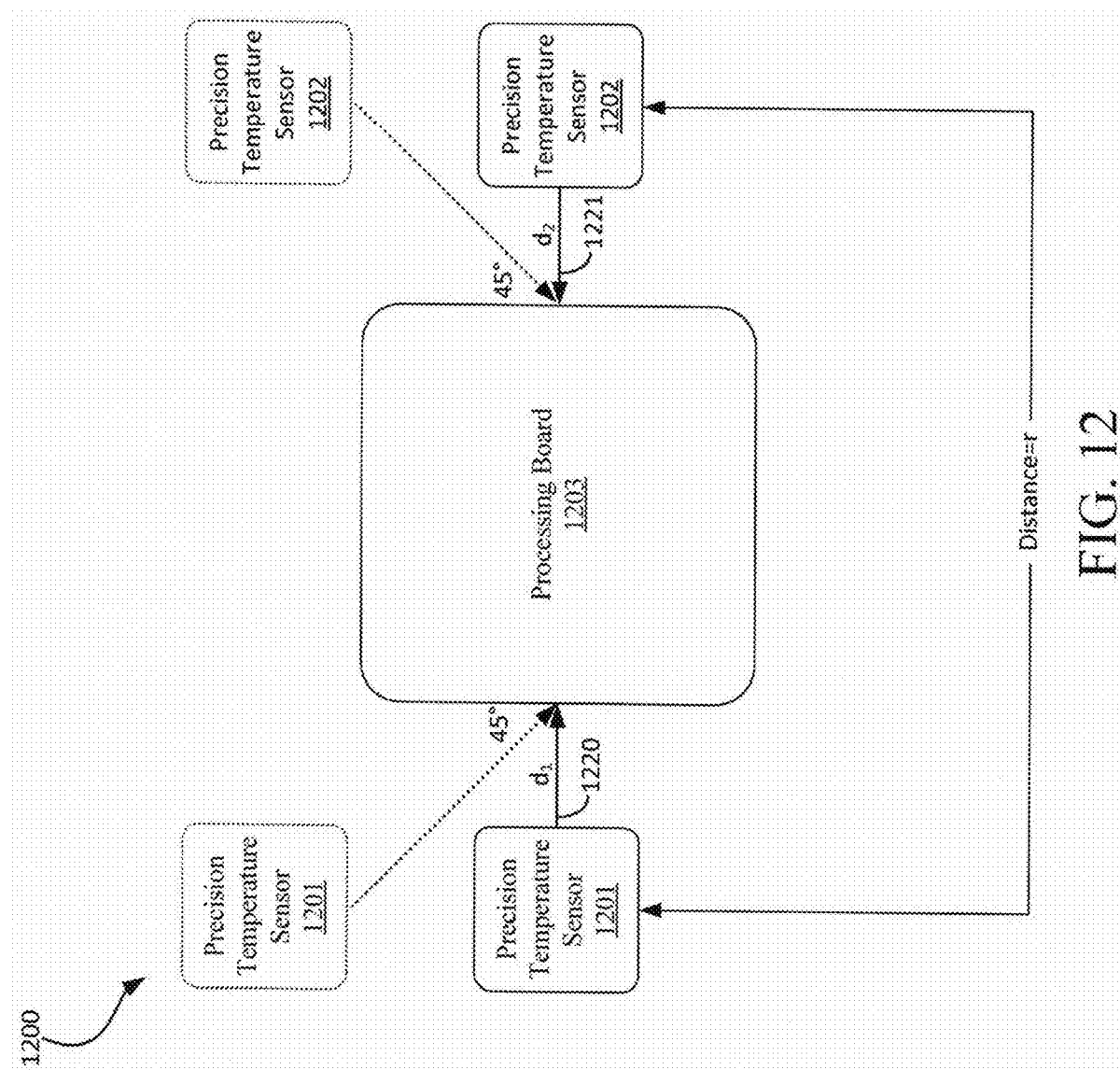
FIG. 12 is a block diagram of an exemplary atmospheric characterization system in accordance with an embodiment of the present disclosure.

FIG. 12 depicts a block diagram of an atmospheric characterization system 1200 in accordance with an embodiment of the present disclosure. The atmospheric characterization system 1200 comprises a central processing board 1203. Further, positioned on opposing sides of the processing board 1203 are precision temperature sensors 1201 and 1202. The precision sensors 1201 and 1202 are positioned equidistance from the processing board 1203, such that $d_1$ is equal to $d_2$. Further, the distance between the precision temperature sensor 1201 and precision temperature sensor 1202 is a predetermined value r.

The precision temperature sensors 1201 and 1202 are shown positioned perpendicularly with respect to the processing board 1203. However, the precision temperature sensors 1201 and 1202 may be positioned at an angle relative to the processing board 1203, as is shown in FIG. 12. In this regard, the precision temperature sensors 1201 and 1202 may be positioned, for example, at a forty-five-degree angle relative to the processing board 1203. Note, however, that the precision temperature sensors 1201 and 1202 are still positioned an equidistance from the processing board 1203, and the precision temperature sensors are positioned a predetermined distance r one from the other.

Further note that the positioning of the precision temperature sensors 1201 and 1202 at a forty-five-degree angle is merely exemplary. The precision temperature sensors 1201 and 1202 may be positioned at other angles relative to the processing board 1203 in other embodiments.

In one embodiment and in accordance with the temperature sensor study described hereinabove, the precision temperature sensors 1201 and 1202 may be high resolution HRES I2C digital temperature sensors with a minimum resolution of 0.00390625 degrees Celsius. However, other sensors having other resolutions may be used in other embodiments.

A differential temperature is the measurement of a temperature difference between precision temperature sensor 1201 and precision temperature sensor 1202 that are positioned a distance r one from the other. To allow for sensor spacing, the atmospheric characterization system 1200 incorporates the center processing board 1203 with the separate precision temperature sensors 1201 and 1202 that are communicatively coupled to a data bus on the processing board 1203, which is described further with reference to FIG. 13.

In this regard, the precision temperature sensors 1201 and 1202 are communicatively coupled to the processing board 1203 via connections 1220 and 1221, respectively. In one embodiment, the connections 1220 and 1221 may be cables for transferring data indicative of measured temperatures to the processing board 1203 upon demand or periodically.

In another embodiment, the connections 1220 and 1221 may represent wireless connections. In such an embodiment, the precision temperature sensors 1201 and 1202 may each comprise a wireless transceiver. Further, the processing board may comprise a wireless transceiver. Thus, data indicative of temperature values may be transmitted periodically or upon demand to the processing board 1203 via the wireless connections 1220 and 1221.

During operation, each precision temperature sensor 1201 and 1202 measures a respective temperature simultaneously. Thereafter, the precision temperature sensors 1201 and 1202 transmit data indicative of the temperatures measured to the processing board 1203 either periodically or upon demand. As will be described further with reference to FIG. 13, the processing board calculates a value indicative of atmospheric turbulence, which is described further herein.

The data indicative of atmospheric turbulence may be used to build an atmospheric weather model used to predict, given a certain time of day and ground temperature, a model for what the atmosphere looks like in elevation versus temperature over time. Notably, the atmospheric turbulence data may be used to correct for temperature changes that bend a beam of light in an optical system. As an example, the atmospheric characterization system 1200 and a laser system may be co-mounted on a ground vehicle. The atmospheric turbulence data received from the atmospheric system 1200 may be used to correct a mirror that deforms the laser beam so that the laser points straight at a target. In this regard, the atmospheric turbulence data collected by the atmospheric characterization system 1200 may be used to calibrate the laser system to the surrounding atmospheric conditions.

Figure 13:
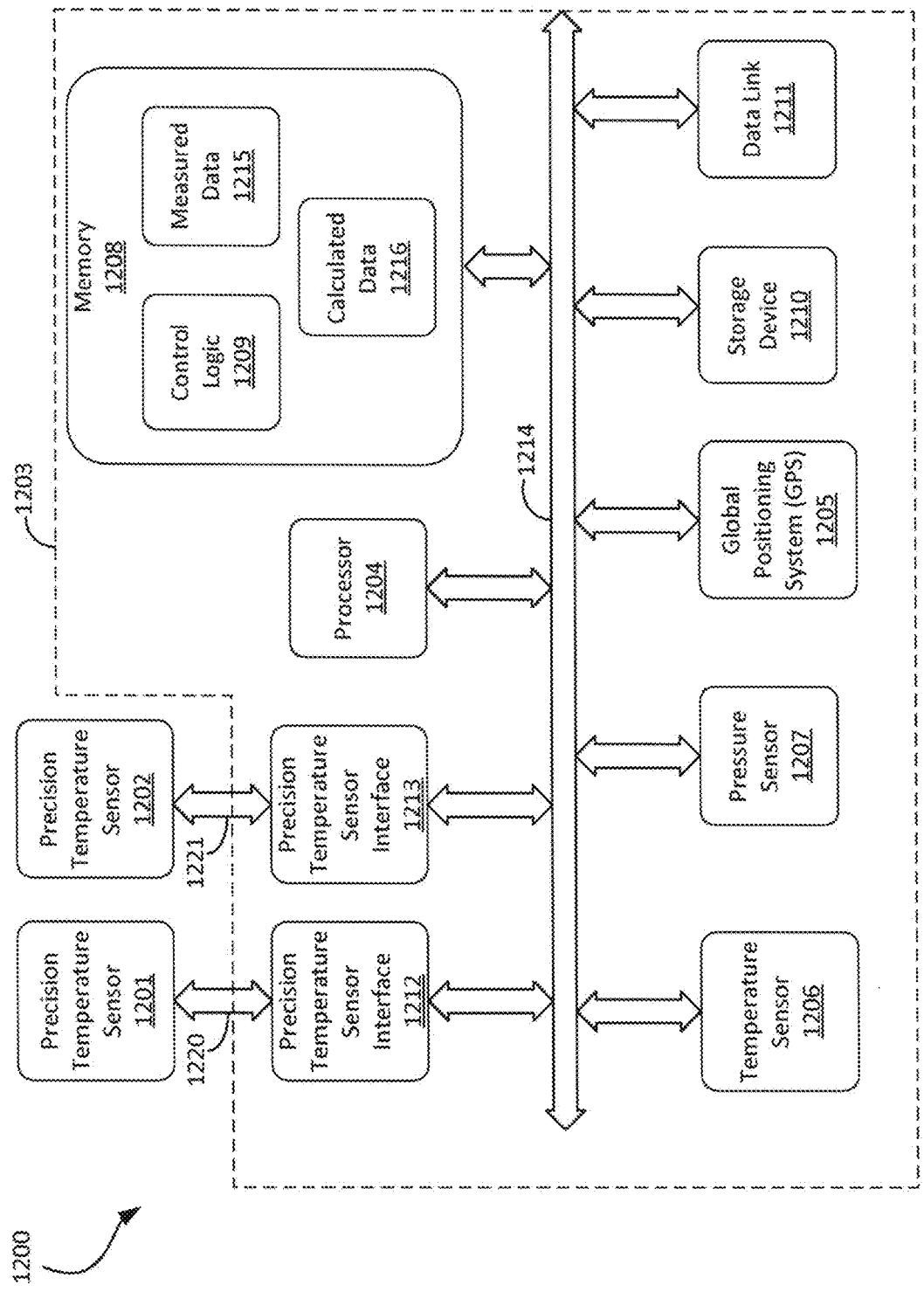
FIG. 13 is a more detailed block diagram of the atmospheric characterization system as shown in FIG. 12.

FIG. 13 depicts an exemplary embodiment of the atmospheric characterization system 1200. As shown by FIG. 13, the atmospheric characterization system 1200 comprises the precision temperature sensors 1201 and 1202 and the processing board 1203.

The processing board 1203 comprises a processor 1204, a temperature sensor 1206, a pressure sensor 1207, a global positioning system (GPS) 1205, and a storage device 1210. Further, the processing board 1203 comprises memory 1208 for storing control logic 1209, measured data 1215, and calculated data 1216. Note that the measured data 1215 and the calculated data 1216 may also be stored on an onboard storage device 1210, such as a storage device (SD) card.

In one embodiment, the processing board 1203 may comprise a data link 1211. In this regard, measured data 1215 and/or calculated data 1216 may be transferred from the processing board 1203 to another computing device (not shown) to use in designing, modifying, or calibrating an optical system. Additionally, the calculated data 1215 may be used to correct an existing onboard optical system.

The control logic 1209 generally controls the functionality of the processing board 1203, as will be described in more detail hereafter. It should be noted that the control logic 1209 can be implemented in software, hardware, firmware or any combination thereof. In an exemplary embodiment illustrated in FIG. 13, the control logic 1209 is implemented in software and stored in memory 1208.

Note that the control logic 1209, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The processor 1204, such as a digital signal processor (DSP) or a central processing unit (CPU), communicates with and drives the other elements within the processing board 1203 via at least one bus 1214. Further, the processor 1204 is configured to execute instructions of software, such as the control logic 1209.

The temperature sensor 1206 is configured to measure an ambient temperature of the environment in which the atmospheric characterization system is operating. In this regard, the temperature sensor 1206 measures the surrounding temperature periodically, and the measured temperature is used in generating calculated data 1216, which is described further herein.

The pressure sensor 1207 is configured to measure an ambient pressure of the environment in which the atmospheric characterization system is operating. In this regard, the pressure sensor 1207 measures the surrounding pressure periodically, and the measured pressure is used in generating calculated data 1216, which is described further herein.

To account for accurate time stamps on data collected during operation of the atmospheric characterization system 1200, the GPS 1205 is used to accurately record location and time. The GPS 1205 allows for many differential temperature nodes at separate spatial locations to be used during one test with high confidence that recorded time is correct.

The processing board 1203 further comprises precision temperature sensor interfaces 1212 and 1213. The temperature sensor interfaces 1212 and 1214 communicatively couple the processing board 1203 with the precision temperature sensors 1201 and 1202, respectively, over connections 1220 and 1221, respectively. The precision temperature sensor interfaces 1212 and 1213 may be a port for receiving a cable the couples the precision temperature sensors 1201 and 1202 to the processing board 1203.

In another embodiment, the connections 1220 and 1221 may be wireless connections that communicatively couple the precision temperature sensors 1201 and 1202 to the precision temperature sensor interfaces 1212 and 1214. In such an embodiment, the precision temperature sensors 1201 and 1202 comprise a wireless transceiver for sending data indicative of measured temperature to the processing board 1203. Further, the precision temperature sensor interfaces 1212 and 1213 comprise a wireless transceiver for receiving data indicative of temperature from the precision temperature sensors 1201 and 1202.

In operation, the precision temperature sensors 1201 and 1202 periodically measure the atmospheric temperature. Upon request or automatically, the precision temperature sensors 1201 and 1202 transmit data indicative of the temperatures measured to the processing board 1203.

Upon receipt of the data indicative of the temperatures measured, the control logic 1209 stores the data indicative of the temperatures measured in measured data 1215 correlated with a location and time stamp requested from the GPS 1205.

Upon receipt of the measured data 1215 or periodically, the control logic calculates a value indicative of atmospheric turbulence at the noted location and time. In this regard, the control logic 1209 calculates a temperature structure coefficient using the following equation 14 described hereinabove, which is repeated here for clarity:

$$C_T^2 = \frac{\langle \Delta T^2 \rangle}{r^{2/3}},\qquad\text{Equation 14}$$

wherein the $\Delta T$ is the difference between the measured temperature from precision temperature sensor 1201 and the measured temperature from precision temperature sensor 1202. In this regard, the control logic 1209 subtracts the measured temperature from precision temperature sensor 1201 from the measured temperature from precision temperature sensor 1202. Further, the r in the dividend is the distance between precision temperature sensor 1201 and precision temperature sensor 1202. The result is the temperature structure coefficient $C_T^2$.

The control logic then uses the temperature structure coefficient $C_T^2$ to obtain a value indicative of the atmospheric turbulence $C_n^2$ using equation 13 repeated here for clarity:

$$C_n^2 = [79^{P/T^2}]^2 \times 10^{-12} C_T^2,\qquad\text{Equation 13}$$

wherein the P value is the ambient pressure obtained from the pressure sensor 1207, and the T value is ambient temperature obtained from the temperature sensor 1206.

Once the atmospheric turbulence is calculated, data indicative of the atmospheric turbulence may be stored as calculated data 1216. In the alternative or in addition, the data indicative of the atmospheric turbulence may be stored on the storage device 1210. In one embodiment, the data indicative of the atmospheric turbulence may be transmitted from the processing board 1203 to a computing device (not shown) over the data link 1211.

As described hereinabove, the data indicative of the atmospheric turbulence may then be used to generate an atmospheric weather model used to predict what the atmosphere looks like in elevation versus temperature over time, which can be used in design of an optics system to correct for atmospheric effects. Additionally, the data indicative of atmospheric turbulence may be used to correct an optical system so that a laser of the system points in a straight line to its intended target. Further, the data indicative of atmospheric turbulence may be used to calibrate an optical system so that the laser accurately points to its intended target.

Figure 14:
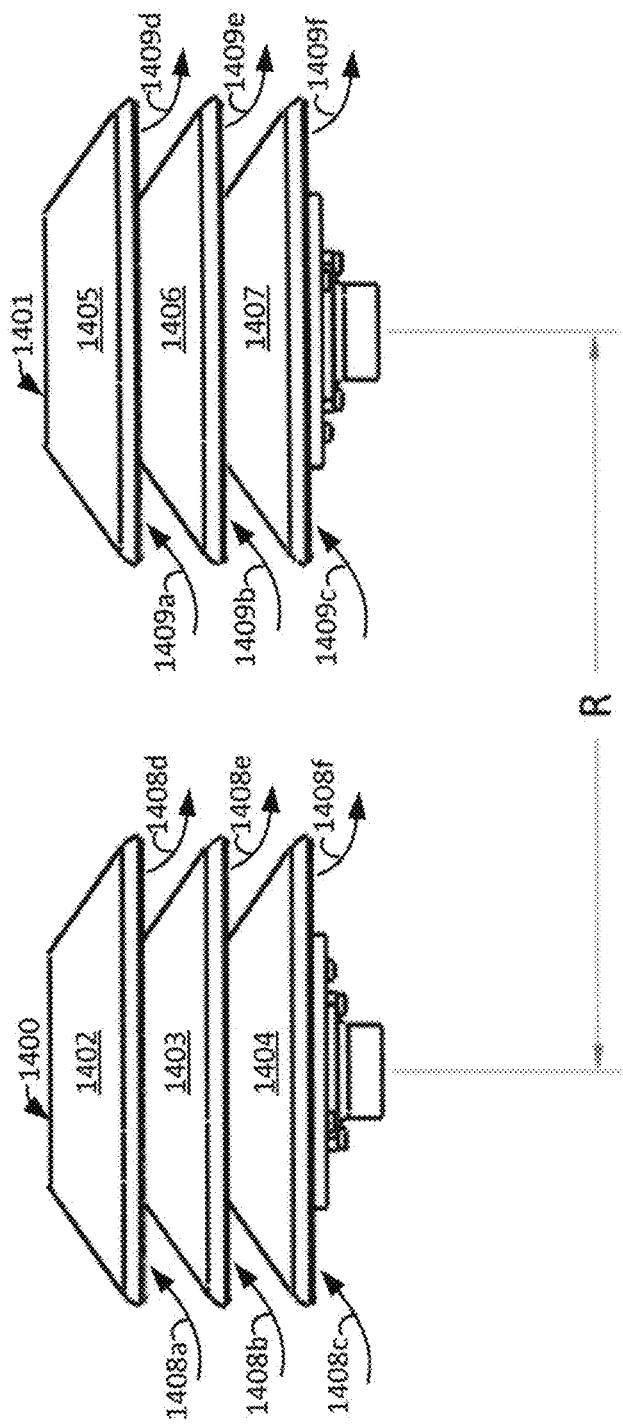
FIG. 14 is a diagram of exemplary solar radiation shields used in the atmospheric characterization system as shown in FIG. 12.

Note that during operation, performance of each of the precision temperature sensors 1201 and 1202 may be affected by solar radiation when exposed to direct sunlight. FIG. 14 depicts an embodiment of the precision temperature sensors 1201 and 1202 of the atmospheric characterization system 1200, wherein each of the precision temperature sensors 1201 and 1202 are coupled to and protected against direct sunlight by respective solar radiation shields 1400 and 1401. The solar radiation shields 1400 and 1401 are configured to allow airflow through the sensor housing but not allow any light above the horizon to reach the precision temperature sensors 1201 and 1202

In this regard, each solar radiation shield 1400 and 1401 comprises three conical-shaped layers 1402-1404 and 1405-1407, respectively. The conical-shaped layers 1402-1404 and 1405-1407 are coupled together; however, a cylindrical opening under each layer allows air to flow through the solar radiation shields 1400 and 1401 as indicated by reference arrows 1408a-1408f and 1409a-1409f. Because the air flow flows through the solar radiation shields 1400 and 1401, the operation of the precision temperature sensors 1201 and 1202 are un affected by the respective radiation shields 1400 and 1401.

Figure 15:
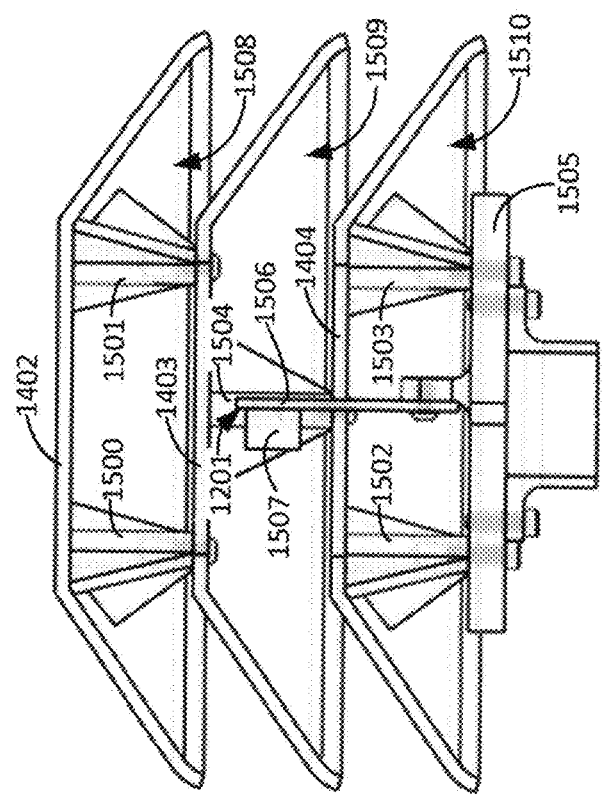
FIG. 15 is a cross-sectional view of one of the solar radiation shield shown in FIG. 14.

FIG. 15 depicts a cross-sectional view of the solar radiation shield 1400. Note that the solar radiation shields 1400 and 1401 are identical. Thus, the description of the solar radiation shield 1400 equally applies to the solar radiation shield 1401. For simplicity, only one, solar radiation shield 1400, is discussed herein.

The solar radiation shield 1400 comprises the three conical-shaped layers 1402-1404. The top layer 1402 is coupled to the middle layer 1403 via connectors 1500 and 1501. Further, the middle layer 1403 is coupled to the bottom layer via connector 1502. Additionally, the bottom layer 1403 is coupled to a bracket 1505.

The precision temperature sensor 1201 comprises a temperature sensor 1507 and a printed circuit board 1506 to which the sensor 1507 is electrically coupled. The printed circuit board 1506 is coupled to the bracket 1505.

Each conical-shaped layer 1402-1404 has a radial opening 1508-1510, respectively. These radial openings 1508-1510 allow air to flow freely through the solar radiation shield 1400. Because the air may flow freely through the solar radiation shield 1400, operation of the precision temperature sensor 1201 is unaffected by direct sunlight and the precision temperature sensor 1201 is able to still accurately measure surrounding temperature.

Figure 16:
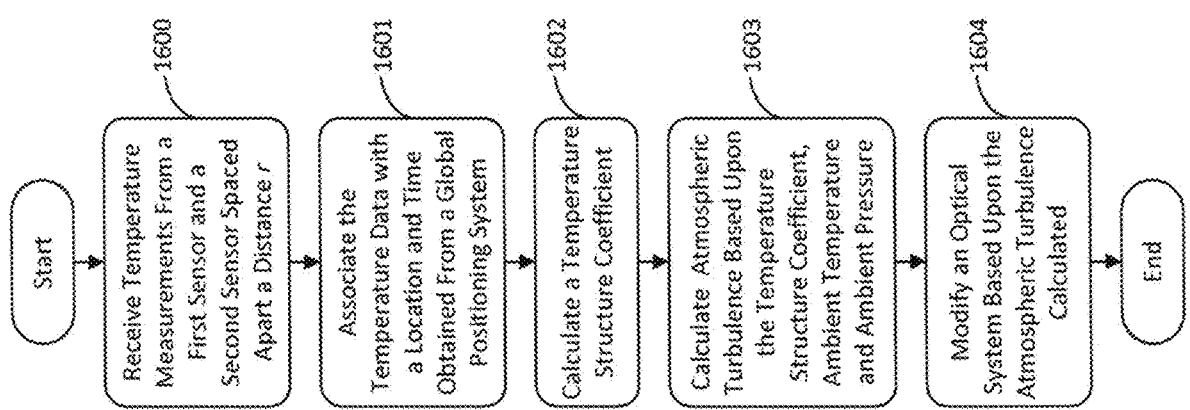
FIG. 16 is a flowchart depicting the architecture and functionality of the atmospheric characterization system shown in FIG. 12.

FIG. 16 is a flowchart of the architecture and functionality of the atmospheric characterization system 1200 (FIG. 13).

The processor board 1203 (FIG. 13) periodically or upon demand receives data indicative of temperature measurements made by precision temperature sensor 1201 and precision temperature sensor 1202 in step 1600. The precision temperature sensors 1201 and 1202 are spaced apart a distance r, which is predefined during manufacturing of the atmospheric characterization system 1200.

Upon receipt of the data indicative of the temperature measurements, the control logic 1209 obtains a reading from the global positioning system (GPS) 1205. In step 1601, the control logic 1209 associates the temperature data with a location and time stamp obtained from the GPS 1205.

In step 1602, the control logic 1209 calculates a temperature structure coefficient by using equation 14 described hereinabove. In calculating the temperature structure coefficient, the control logic 1209 uses the difference in temperature between precision temperature sensors 1201 and 1202 and the distance r between the precision temperature sensors 1201 and 1202.

In step 1603, the control logic 1209 calculates a value indicative of atmospheric turbulence based upon the temperature structure coefficient, the ambient temperature obtained from temperature sensor 1206 (FIG. 13) and the ambient pressure obtained from pressure sensor 1207 (FIG. 13).

Once the atmospheric turbulence is calculated in step 1603, in step 1604, the atmospheric turbulence values over time may be used to modify an optical system based upon the atmospheric turbulence value.

What I claim is:

1. An atmospheric characterization system, comprising:
a central processing board comprising a first communication interface and a second communication interface;
a first precision temperature sensor communicatively coupled to the central processing board via the first communication interface and positioned a distance from a first side of the processing board, the first precision temperature sensor configured for measuring a first temperature and transferring data indicative of the first temperature to the central processing board;
a second precision temperature sensor communicatively coupled to the central processing board via the second communication interface and positioned the distance from a second opposing side of the central processing board such that the first precision temperature sensor and the second precision temperature sensor are equidistant from the central processing board and there is a predetermined distance, r, between the first precision temperature sensor and the second precision temperature sensor, the second precision temperature sensor configured for measuring a second temperature and transferring data indicative of the second temperature to the central processing board simultaneously with the transfer of the data indicative of the first temperature; and
a processor configured for receiving the data indicative of the first temperature and the data indicative of the second temperature and calculating a value indicative of atmospheric turbulence based upon the first temperature and the second temperature.

2. The atmospheric characterization system of claim 1, wherein the first precision temperature sensor comprises a first wireless transceiver and the second precision temperature sensor comprises a second wireless transceiver, the first wireless transceiver and the second wireless transceiver configured for communicatively connecting to a third wireless transceiver on the central processing board, wherein the first precision temperature sensor and the second precision temperature sensor are configured for transmitting the data indicative of the first temperature and the data indicative of the second temperature to the central processing board wirelessly.

3. The atmospheric characterization system of claim 1, wherein the first precision temperature sensor is positioned on the first side of the central processing board at an angle relative to the central processing board and the second precision temperature sensor is positioned on the second opposing side at the angle relative to the central processing board.

4. The atmospheric characterization system of claim 1, wherein the processor is further configured for calculating a temperature structure coefficient based upon the first temperature, the second temperature, and the predetermined distance, r.

5. The atmospheric characterization system of claim 4, wherein the central processing board further comprises an ambient temperature sensor configured for detecting an ambient temperature and an ambient pressure sensor configured for detecting an ambient pressure.

6. The atmospheric characterization system of claim 5, wherein the processor is further configured for calculating the value indicative of the atmospheric turbulence based upon the calculated temperature structure coefficient, the ambient temperature, and the ambient pressure.

7. The atmospheric characterization system of claim 1, wherein each of the first precision temperature sensor and the second precision temperature sensor is coupled to and covered by a first radiation shield and a second radiation shield, respectively.

8. The atmospheric characterization system of claim 7, wherein the first radiation shield and the second radiation shield each comprises at least one layer.

9. The atmospheric characterization system of claim 8, wherein the at least one layer of the first radiation shield and the second radiation shield comprises a radial opening on an underside of the layers to allow air flow through the first and second radiation shields thereby allowing accurate temperature measurements by the first precision temperature sensor and the second precision temperature sensor.

10. The atmospheric characterization system of claim 1, wherein the central processing board further comprises a global positioning system (GPS).

11. The atmospheric characterization system of claim 10, further comprising a storage device (SD) card, wherein data indicative of the value indicative of atmospheric turbulence and data indicative of an associated location and time obtained from the GPS are stored on the SD card.

12. The atmospheric characterization system of claim 10, wherein the central processing board further comprises a data link.

13. The atmospheric characterization system of claim 12, wherein data indicative of the value indicative of atmospheric turbulence and data indicative of an associated location and time are transmitted to a computing device via the data link.

14. The atmospheric characterization system of claim 1, communicatively linked to a free-space optical system.

15. The atmospheric characterization system of claim 14, wherein the free-space optical system is a terrestrial telescope, a free-space laser communication system, or a High Energy Laser (HEL) free space system.

16. An atmospheric characterization method for providing a value indicative of atmospheric turbulence for use in a free-space optical system, comprising:
measuring a first temperature via a first precision temperature sensor communicatively coupled to a central processing board and positioned a distance from a first side of the central processing board;

measuring a second temperature via a second precision temperature sensor communicatively coupled to the central processing board and positioned the distance from a second opposing side of the central processing board such that the first precision temperature sensor and the second precision temperature sensor are equidistant from the central processing board, and there is a predetermined distance, r, between the first precision temperature sensor and the second precision temperature sensor;

transferring data indicative of the first temperature and data indicative of the second temperature to the central processing board simultaneously;

receiving, by a processor, the data indicative of the first temperature and the data indicative of the second temperature;

calculating a value indicative of atmospheric turbulence based upon the first temperature, the second temperature, and the predetermined distance, r; and providing the value indicative of atmospheric turbulence for use in designing, modifying, calibrating, or correcting a free-space optical system.

17. The atmospheric characterization method of claim 16, wherein the transferring step is completed upon demand from the processor.

18. The atmospheric characterization method of claim 16, wherein the transferring step is completed periodically.

19. The atmospheric characterization method of claim 16, wherein the first precision temperature sensor and the second precision temperature sensor each comprises a cable for communicatively connecting to communication interfaces on the central processing board, the method further comprising transmitting the data indicative of the first temperature and the data indicative of the second temperature to the central processing board over the cables.

20. The atmospheric characterization method of claim 16, wherein the first precision temperature sensor comprises a first wireless transceiver and the second precision temperature sensor comprises a second wireless transceiver, the first wireless transceiver and the second wireless transceiver configured for communicatively connecting to communication interfaces on the central processing board, wherein the communication interfaces comprise a third wireless transceiver, the method further comprising transmitting the data indicative of the first temperature and the data indicative of the second temperature to the central processing board wirelessly.

21. The atmospheric characterization method of claim 16, further comprising calculating, by the processor, a temperature structure coefficient based upon the first temperature, the second temperature, and the predetermined distance, r.

22. The atmospheric characterization method of claim 21, wherein the central processing board further comprises an ambient temperature sensor and an ambient pressure sensor, the method further comprising:
 detecting an ambient temperature by the ambient temperature sensor; and
 detecting an ambient pressure by the ambient pressure sensor.

23. The atmospheric characterization method of claim 22, further comprising calculating, by the processor, the value indicative of the atmospheric turbulence based upon the calculated temperature structure coefficient, the ambient temperature, and the ambient pressure.

24. The atmospheric characterization method of claim 16, wherein the central processing board further comprises a global positioning system configured for obtaining data indicative of a location and a time associated with the first temperature and the second temperature.

25. The atmospheric characterization method of claim 24, wherein the central processing board further comprises a storage device (SD) card, the method further comprising storing data indicative of the value indicative of the atmospheric turbulence and the data indicative of the associated location and time.

26. The atmospheric characterization method of claim 24, wherein the central processing board further comprises a data link, the method further comprising transmitting data indicative of the value indicative of the atmospheric turbulence and the data indicative of the associated location and time to a computing device.

* * * * *